March 10, 1936. E. H. SCHULTZ, JR 2,033,207
CASTER WHEEL APPLIANCE
Filed Aug. 5, 1935
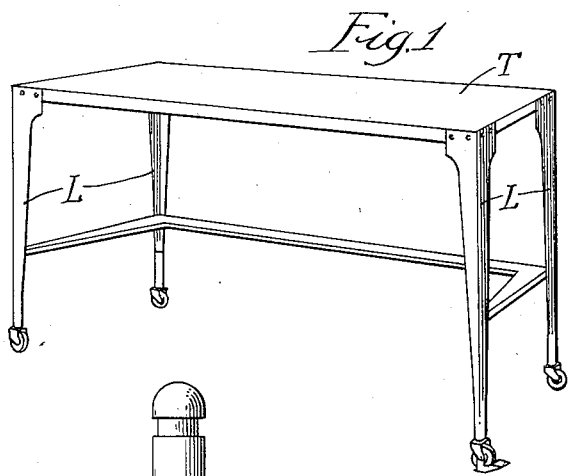
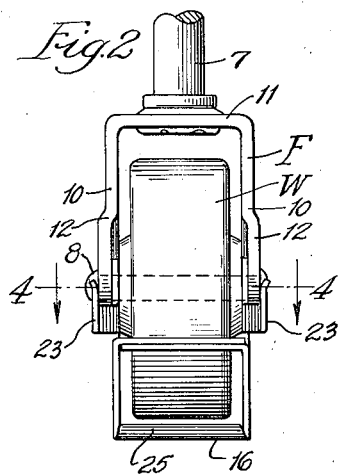
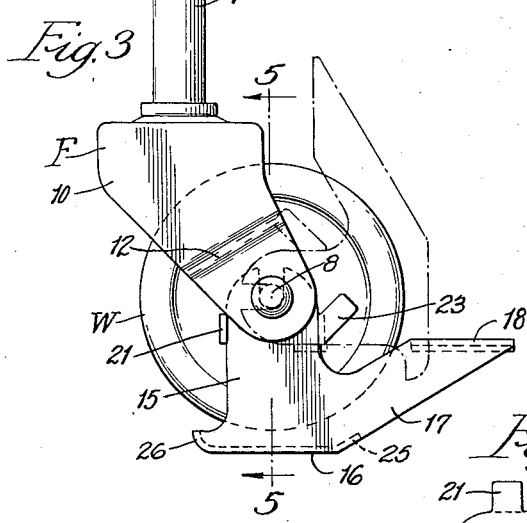
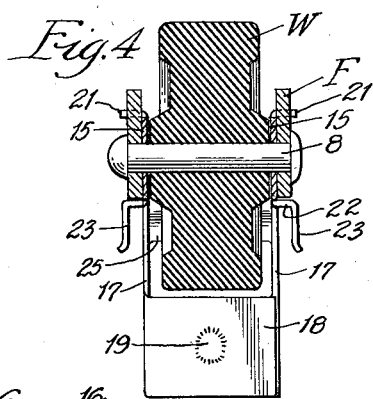
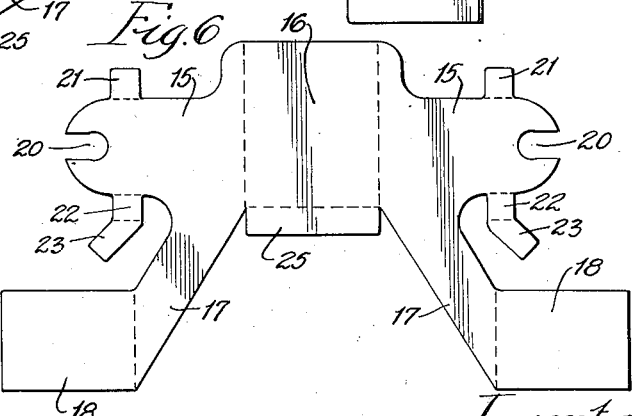
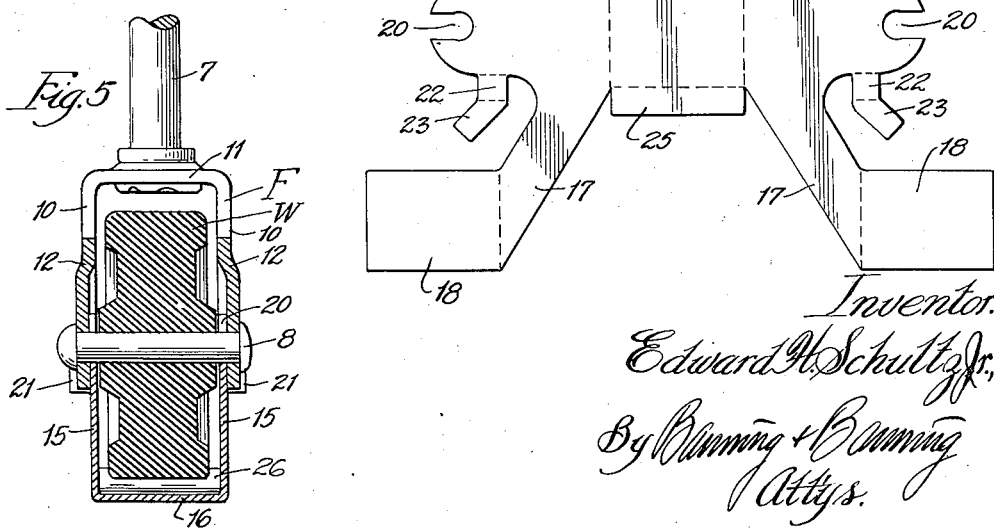

Patented Mar. 10, 1936

2,033,207

UNITED STATES PATENT OFFICE 2,033,207

CASTER WHEEL APPLIANCE

Edward H. Schultz, Jr., Chicago, Ill., assignor to The Nagel-Chase Mfg. Co., Chicago, Ill., a corporation of Illinois Application August 5, 1935, Serial No. 34,695

6 Claims. (Cl. 16—34)

This invention relates to an appliance designed for association with a caster wheel. It may be assembled permanently with the frame for a caster wheel, or be attached thereto as a supplementary appliance.

Among the objects which are accomplished by my improved appliance are these: (1) it serves practically and effectively, to restrain movement of equipment which is supported upon caster wheels and may be operated by either hand or foot; (2) the appliance serves to electrically ground the caster wheel frame, permitting the use of a wheel which is made of insulating material; (3) the appliance may be formed for assembly with the caster wheel frame either in the process of manufacture or subsequently as an added attachment; (4) a lug acts as a stop when the appliance is moved to its locked position; (5) means are provided for retaining the appliance in unlocked position, and for serving as a stop when reaching that position; (6) a beveled surface on the appliance assures an easy movement of the associated wheel either on or off the floor; (7) the mounting for the appliance is such that when it has swung past a center position, an extended area of surface is presented for contact with the floor; (8) the appliance may easily be unlocked as by a rolling action of the caster wheel in one direction; and (9) the appliance is neat in appearance and may be economically produced by die operations from a single piece of material.

These and other objects of my invention are realized by a construction such as is shown in the accompanying drawing wherein—

Figure 1 is a perspective view of an ironing table having each of its four legs equipped with a caster wheel, the one in the foreground being equipped with the appliance of this invention;

Fig. 2 is a vertical elevation looking toward the periphery of the caster wheel with which is associated the present appliance;

Fig. 3 is a side elevation of the wheel showing the appliance applied thereto;

Fig. 4 is a horizontal section taken on line 4—4 of Fig. 2;

Fig. 5 is a vertical section taken on line 5—5 of Fig. 3; and

Fig. 6 is a view of the blank from which the appliance may be formed.

Caster wheels of the kind for which my present appliance is designed are used with various kinds of equipment, such as light machinery. A washing machine is one example, a mangle is another, and an ironing table is still another. The metallic table T of Fig. 1 illustrates the latter, and it is shown as provided with four legs L, each of which is equipped at its lower end with a caster wheel. As is common practice, each caster wheel unit comprises a stem 7 upstanding from a frame F in which is mounted a wheel W adapted to rotate about an axle pin 8.

The wheel frame, as shown, is in the form of a yoke having side arms 10 depending from a connecting bridge 11. Each arm may be offset outwardly slightly as at 12 whereby its end adjacent the hub of the wheel is slightly separated therefrom. The axis of the stem 7 lies in a plane which is offset with respect to the axle 8 so that the entire wheel mounting may swing about a vertical axis, permitting the wheel to move to various positions in accordance with the direction in which it is desired that the table or other supported appliance should be shifted.

Associated with a caster wheel unit of the kind described is the appliance of my invention. As shown, this may be formed from a one-piece blank a development view of which appears in Fig. 6. When bent to yoke form, it comprises a pair of arms 15 which upstand from a base plate 16 having a pair of tension arms 17 each carrying at its extremity a rectangular pressure plate 18. The plates 18 are turned toward each other to lie in adjacent overlapping relation where they may be secured together, as by a spot weld 19.

Each arm 15 of the appliance yoke is provided near its upper end with an opening 20 through which the axle pin 8 is adapted to be extended. This opening may, if desired, be in the form of a slot having its opposite edges so spaced as to require a slight yielding when fitted over the axle pin. Such a construction adapts the appliance yoke to be applied to or removed from the caster unit, after manufacture thereof, as a supplementary attachment. The arms of the appliance yoke may be fitted either inside or outside of the arms of the caster wheel frame, as desired. As shown, the appliance yoke will have capacity for swinging about the axle pin co-axially with the wheel, although it may be optionally mounted to swing otherwise. Its down position is shown by full lines in Fig. 3, and its up position by the dotted lines therein.

A lug 21 is extended laterally from each yoke arm 15 and bent to a position which will engage the arm 10 of the caster wheel frame when the appliance is swung to down position. The two lugs, one engaging with each frame arm, thus act as stops. A further lug 22 may be oppositely extended from each arm of the appliance yoke.

Each of these latter lugs comprise an end extension which is bent into a plane nearly but not quite parallel with the arms of the wheel frame so as to engage therewith with a variable friction when the appliance yoke is swung upwardly to the dotted line position of Fig. 3. By means such as this I provide a releasable lock for sustaining the appliance yoke in its inactive position.

The construction which I have described is such that the appliance yoke which is made of one piece will be sustained in elevated or inactive position as long as desired. When, however, the appliance is to be operated, the yoke is pushed down until it engages with the floor. For this purpose pressure of the hand or foot is desirably exerted upon the plate 18. A slight rolling movement of the caster wheel will thereupon cause the appliance to be rocked to its extreme downward position, as shown in Fig. 3, where the lugs 21, acting as stops, engage the side arms of the caster wheel. In this position the base plate 16 of the yoke is rested flat upon the floor. In reaching this position the appliance rides up on a beveled lip 26 at one end of the base plate, the lip thus serving as a cam to render this motion smooth and easy. A second lip 25 at the end of the base plate opposite that whereon the lip 26 is formed serves to provide a smooth surface which will prevent scratching of the floor.

It will be noted that the appliance yoke which is desirably made of sheet metal, establishes a ground connection with the floor. This is desirable because it permits the use of insulating material for all the caster wheels on which the table or other appliance is supported.

The various objects hereto enumerated are all attained by the simple construction which has been described at length. It is accordingly with a view to protection on such an appliance, attachable to caster wheels or other types of wheels, that the following claims are advanced.

I claim:

1. In combination with a caster wheel having a supporting yoke frame, an appliance, an axle pin interconnecting the wheel, yoke frame and appliance, the appliance comprising interconnected relatively immovable base and pressure plates positioned adjacent each other and proximate to the wheel periphery upon the same side thereof but clear of the wheel and swingable as a unit about a fixed point from a position in which the pressure plate lies substantially above the wheel and the base plate ahead of the wheel to a second position in which the base plate is below the wheel and the pressure plate ahead of the wheel.

2. In combination with a caster wheel having a supporting yoke frame, an appliance comprising a yoke having its arms pivoted to the arms of the wheel frame, and means carried by an arm of the appliance yoke adapted to frictionally engage the wheel frame when the appliance is swung to an upper position whereby to become releasably sustained in such position.

3. In combination with a caster wheel having a supporting yoke frame, an appliance comprising a yoke having its arms disposed alongside the arms of the wheel frame, means permitting the appliance arms to establish by a sliding movement pivotal connection with the arms of the wheel frame, and means carried by the appliance arms adapted to underlie the wheel and furnish a base support for the caster wheel frame.

4. In combination with a caster wheel having a supporting yoke frame, an appliance comprising a yoke having its arms pivoted to the arms of the wheel frame, a base plate and a pressure plate both carried by the appliance yoke at points outside the periphery of the wheel, and interengaging means on the wheel frame and appliance yoke acting to limit swinging movement of the latter in one direction at a point where the base plate is disposed beneath the wheel.

5. In combination with a caster wheel having a supporting yoke frame, an appliance comprising a yoke having its arms pivoted to the arms of the wheel frame, a base plate carried by the appliance yoke at a point outside the periphery of the wheel, interengaging means on the wheel frame and appliance yoke acting to limit swinging movement of the latter between a point where the base plate is disposed beneath the wheel and a second point where the base plate is up beside the wheel, and interengaging means on the wheel frame and appliance yoke acting to sustain the latter in said up position.

6. In combination with a caster wheel through which is an axle pin supported in a yoke frame, an appliance comprising a yoke having arms adapted to lie alongside the arms of the wheel frame, a single releasable pivotal connection between the appliance yoke and the axle pin of the wheel frame, and base means carried by the appliance yoke adapted to swing therewith to a position beneath the wheel for elevating the latter and for sustaining the wheel frame against travel upon a horizontal surface.

EDWARD H. SCHULTZ, Jr.